(12) United States Patent
Codilian et al.

(10) Patent No.: US 6,781,787 B1
(45) Date of Patent: Aug. 24, 2004

(54) ADJUSTING SEEK CURRENT PROFILE ON THE FLY

(75) Inventors: Raffi Codilian, Irvine, CA (US); Kent W. Gibbons, Trabuco Canyon, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 402 days.

(21) Appl. No.: 10/062,835

(22) Filed: Jan. 31, 2002

(51) Int. Cl.$^7$ ............................................. G11B 5/596
(52) U.S. Cl. ................................................. 360/78.06
(58) Field of Search ........................... 360/78.06, 78.04

(56) References Cited

U.S. PATENT DOCUMENTS 5,119,250 A   6/1992  Green et al.
5,793,558 A   8/1998  Codilian et al.
6,271,636 B1  8/2001  Galloway

*Primary Examiner*—David Hudspeth
*Assistant Examiner*—Mitchell Slavitt
(74) *Attorney, Agent, or Firm*—Milad G. Shara, Esq.; Knobbe Martens Olson & Bear

(57) ABSTRACT

A hard disk drive that determines a saturation current of a voice coil motor (VCM) during the acceleration portion of a seek operation, and uses the information to advantageously adjust current profile for subsequent portion of the seek. One example of determining the saturation current is utilization of the peak value of the saturated acceleration current whose magnitude depends on operating conditions such as temperature and supply voltage. Traditional hard disk drives use predetermined seek current profiles that are formed conservatively to account for such variations in the available current to the VCM, at the expense of sacrificing some seek performance. By determining the available current for each seek operation, the current profile can be adjusted on the fly so as to improve the seek performance.

55 Claims, 13 Drawing Sheets

ADJUSTING SEEK CURRENT PROFILE ON THE FLY

BACKGROUND OF THE INVENTION

1. Field of the Invention

The present invention relates to computer data storage devices and, in particular, relates to a hard disk drive having an actuator controller that adjusts seek current profile on the fly so as to improve seek performance.

2. Description of the Related Art

Hard disk drive storage devices are an important component in virtually all computer systems. In particular, hard disk drives provide computer systems with the ability to store and retrieve data in a non-volatile manner such that the data is maintained even if power is removed from the device. The popularity of these devices is based on their ability to quickly store and retrieve large quantities of digital information at low cost. However, because the computer industry continually strives to provide computer systems with increased performance, there exists a need for improved disk drives having increased data access speeds.

The typical hard disk drive comprises one or more pivotally mounted disks having a magnetic recording layer disposed thereon and a plurality of magnetic transducer elements for affecting and sensing the magnetization states of the recording layer. The recording layer comprises a large number of relatively small domains disposed thereon that can be independently magnetized according to a localized applied magnetic field and that can be maintained in the magnetized state when the external field is removed. The domains are grouped into concentric circular tracks each having a unique radius on the disk and data is written to or read from each track by positioning the transducer over the disk at the corresponding radius while the disk is rotated at a fixed angular speed.

To position the transducer with respect to the disk, the typical hard disk drive further comprises a head stack assembly (HSA) that includes a transducer, a pivotally mounted actuator arm for supporting the transducer, a voice coil motor (VCM) for exerting a torque onto the actuator arm, and a servo-controller for controlling the VCM. The VCM comprises a coil of conducting wire wound into a plurality of loops and a permanent magnet disposed adjacent the coil. The servo-controller initiates movement of the actuator arm by directing a control current to flow through the coil which generates a torque that moves the actuator arm. Because the direction of the torque is dictated by the direction of control current flow, the servo-controller is able to reposition the transducer by first directing the control current through the coil so as to angularly accelerate the actuator arm in a first direction and then reversing the control current so as to angularly decelerate the actuator arm.

The time required to reposition the transducer in the foregoing manner is known as the "seek time" of the drive and is an important performance factor that affects the throughput of the drive. For example, a drive having a short seek time will be able to access a requested track of data more quickly than a drive having a longer seek time. Currently, in high performance mass-market drives, the seek time required to reposition the transducer for a given distance of 0.8–0.85 cm is typically in the range of 5–10 ms.

In a typical seek operation, the transducer accelerates, coasts, and decelerates according to the predetermined control of the current applied to the VCM. The transducer, through a feedback control, typically requires some settling time to settle on the proper target track. Once the transducer is on the proper track, a track following current is provided to the VCM in order to maintain tracking.

To perform a seek operation, the current supplied to the VCM typically follows a predetermined profile that includes acceleration and deceleration phases. The profiles are typically stored in the controller, for example in a lookup table. The profiles are generally configured such that maximum acceleration and deceleration values leave ample margins between the values and maximum current that is available for use. One reason for having such margins is that the maximum current available for use by the VCM varies with the operating conditions and drive parameters of the disk drive. Such operating conditions may include factors such as temperature and supply voltage. The drive parameters may include driver FET resistance and VCM winding resistance. As is known in the art, operating conditions and drive parameters both affect how much current can be delivered to the VCM. Consequently, to avoid having the profiles exceeding the maximum available current, the profiles are generally configured in a conservative manner with ample margins that can accommodate a wide range of operating conditions and drive parameters. One method is to determine the worst case scenario of operating conditions and drive parameters, and formulate the worst case operating parameters accordingly.

One reason for attempting to have the current profile always within the available range is that seek operations that demand current beyond what is available may cause a situation where deceleration phase is not able to stop the transducer at the target track. In such a situation, the transducer overshoots the intended target, and a substantial amount of extra time is required to bring the transducer back and settle at the target track. Because of such a negative consequence, the deceleration profiles are generally configured to have ample reserve of current.

One disadvantage of utilizing conservative current profiles is that some seek time is sacrificed. In particular, the deceleration of the VCM, considered to be more important than the acceleration, is configured in a conservative manner because the available current is not known. Thus to decelerate the transducer using profile with conservative deceleration magnitude, the time required for deceleration needs to be extended.

To overcome such degradation in seek time in disk drives where certain specified seek time needs to be achieved for substantially all reasonable operating conditions, one solution is to use a high torque generating magnet to obtain a higher torque for a given VCM current. Such a high torque generating magnet may be implemented by using a magnet formed from high performance magnet materials, or by increasing the physical size of the magnet. While such a solution does achieve a specified seek time using the traditional conservative current profiles, both implementations of the high torque generating magnets are significantly more costly.

From the foregoing, it will be appreciated that there is a need for improved system for performing seek operations. To this end, there is a need for a system that utilizes the full range of available current to the VCM to form a current profile so as to improve the seek performance of the hard disk drive.

SUMMARY OF THE INVENTION

The aforementioned needs are satisfied by one aspect of the invention that relates to a hard disk drive comprising a rotatable disk having a magnetic recording media. The rotatable disk defines a plurality of concentric servo tracks. The hard disk drive further comprises a pivotable actuator that is movable with respect to the rotatable disk. The hard disk drive further comprises a transducer disposed on the actuator so as to be movable with respect to the disk so as to be positionable on a selected servo track of the plurality of concentric servo tracks. The hard disk drive further comprises a voice coil motor that moves the pivotable actuator in response to an applied current so as to permit movement of the transducer from a first location to a second location. The movement comprises an acceleration phase and a deceleration phase. The hard disk drive further comprises a controller for controlling the applied current according to a current profile. The current profile has a first portion corresponding to the acceleration phase, and a second portion corresponding to the deceleration phase. The controller monitors a parameter indicative of the movement of the actuator during the application of the first portion of the current profile to determine a performance related parameter. The controller then utilizes the performance related parameter to adjust the configuration of the second portion of the current profile to thereby reduce the time needed to position the transducer adjacent the second servo track.

In one embodiment, the performance related parameter is a peak acceleration current magnitude. In one specific case, the peak acceleration current is a saturation current whose magnitude depends on operating condition of the disk drive. The saturation current at a given operating condition defines a full range of current available for application to the voice coil motor. Determination of the saturation current magnitude permits adjustment of the current profile to utilize more of the full range of the available current. In another embodiment, the performance related parameter is an average acceleration current magnitude. In one specific case, the average accelerating current magnitude corresponds to an average saturated accelerating current.

In one embodiment, the parameter indicative of the movement of the actuator is the current being applied to the voice coil motor. In one specific case the current is measured directly by an analog to digital converter.

In one embodiment, the parameter indicative of the movement of the actuator is displacement of the transducer. The displacement of the transducer is determined by monitoring the servo wedges and track IDs encountered by the transducer. Rate of change of displacement of the transducer permits monitoring of velocity of the transducer. Rate of change of velocity of the transducer permits monitoring of acceleration of the transducer. The rate of change of velocity may also be determined by monitoring back-emf induced in the voice coil motor. The current being applied to the voice coil motor is inferred from the acceleration of the transducer. Such inference is possible because in one embodiment the acceleration of the transducer is linearly proportional to the current being applied to the voice coil motor.

In one embodiment, the parameter indicative of the movement of the actuator is displacement of the transducer during a predetermined time interval. The displacement of the transducer is correlated to a saturation point of a demanded digital to analog converter (DAC) value. The correlation between the displacement and the saturation DAC value is obtained from a lookup table. In one implementation, such a lookup table is determined during calibration of the disk drive.

In one embodiment, the movement of the transducer comprises a seek operation wherein the first location corresponds to a first servo track and the second location corresponds to a second servo track. The seek operation involves a seek time sufficiently long enough to establish a stable acceleration of the transducer. In one specific case, the sufficiently long enough seek time corresponds to seek lengths greater than approximately 200 servo tracks.

In one embodiment, the performance related parameter is determined during each seek operation. In another embodiment, the performance related parameter is determined periodically. In one specific implementation, the performance related parameter is determined after every 100 seek operations.

Another aspect of the invention relates to a method of adjusting a current profile on the fly during a movement of a transducer. The current profile determines the manner in which current is applied to a voice coil motor so as to move the transducer mounted on an actuator from a first location to a second location. The movement of the transducer comprises an acceleration phase followed by a deceleration phase. The method comprises applying an acceleration current according to the current profile so as to cause the acceleration of the transducer. The method further comprises determining the peak value of the acceleration current. The method further comprises adjusting the subsequent portion of the current profile based at least in part on the peak value of the acceleration current.

In one implementation, applying the acceleration current comprises applying a saturation current. Thus determining the peak value of the acceleration current comprise determining the magnitude of the saturation current. In one embodiment, the magnitude of the saturation current is determined by an analog to digital converter. In another embodiment, the magnitude of the saturation current is determined inferentially by monitoring the acceleration of the transducer. The acceleration of the transducer is determined from monitoring of displacement of the transducer. In yet another embodiment, the magnitude of the saturation current is determined by correlating the displacement of the transducer to the magnitude of the saturation current that caused the displacement. The correlation between the displacement and the magnitude of the saturation current is obtained from a lookup table.

In one implementation, adjusting the subsequent portion of the current profile comprises adjusting the profile of the deceleration current. Adjusting the profile of the deceleration current comprises increasing the magnitude of the deceleration current so as to utilize more of available current range as determined by the saturation current magnitude. Alternatively, adjusting the profile of the deceleration current comprises decreasing the magnitude of the deceleration current.

Yet another aspect of the invention relates to a method of adjusting a current profile that causes movement of a transducer. The current profile has a first portion corresponding to an acceleration phase and a second portion corresponding to a deceleration phase. The method comprises monitoring a parameter indicative of the movement of the transducer during application of the first portion of the current profile. The method further comprises determining a performance related parameter based at least in part on the parameter indicative of the movement of the transducer. The method further comprises adjusting the configuration of the second portion of the current profile based at least in part on the performance related parameter.

In one implementation, monitoring the parameter indicative of the movement of the transducer comprises monitoring a current that causes the movement of the transducer. In one specific case, monitoring the current comprises measuring the current's magnitude using an analog to digital converter.

In another implementation, monitoring the parameter indicative of the movement of the transducer comprises monitoring the position of the transducer. Monitoring the parameter indicative of the movement of the transducer further comprises determining the velocity of the transducer based on the rate of change of the position of the transducer. Alternatively, the velocity of the transducer is determined by monitoring back-emf induced in the voice coil motor. Monitoring the parameter indicative of the movement of the transducer further comprises determining the acceleration of the transducer based on the rate of change of the velocity of the transducer. Monitoring the parameter indicative of the movement of the transducer further comprises determining the current that causes the movement of the transducer based on the acceleration of the transducer, wherein the current is inferred from the acceleration. The current is generally linearly proportional to the acceleration. Thus, determining the performance related parameter comprises determining the magnitude of the current at its peak value. In one specific case, determining the performance related parameter comprises determining the magnitude of a saturation current.

In yet another implementation, monitoring the current comprises monitoring the displacement of the transducer during a predetermined time interval and correlating the displacement to the saturation current magnitude that caused the displacement. The correlation between the displacement and the saturation current magnitude is obtained from a lookup table.

In yet another implementation, adjusting the configuration of the second portion of the current profile comprises adjusting the magnitude of peak value of the current of the second portion of the current profile based on the magnitude of peak value of the current of the first portion of the current profile. Adjusting the configuration of the second portion of the current profile comprises increasing the magnitude of the peak value of the current of the second portion of the current profile. Specifically, increasing the magnitude of the current of the second portion of the current profile comprises increasing the magnitude of the current of the deceleration phase. Alternatively, adjusting the configuration of the second portion of the current profile comprises decreasing the magnitude of the peak value of the current of the second portion of the current profile. Specifically, decreasing the magnitude of the current of the second portion of the current profile comprises decreasing the magnitude of the current of the deceleration phase. In one embodiment employing the various implementations of the method, the movement of the transducer is a seek operation.

DETAILED DESCRIPTION OF THE PREFERRED EMBODIMENT

Figure 1A:
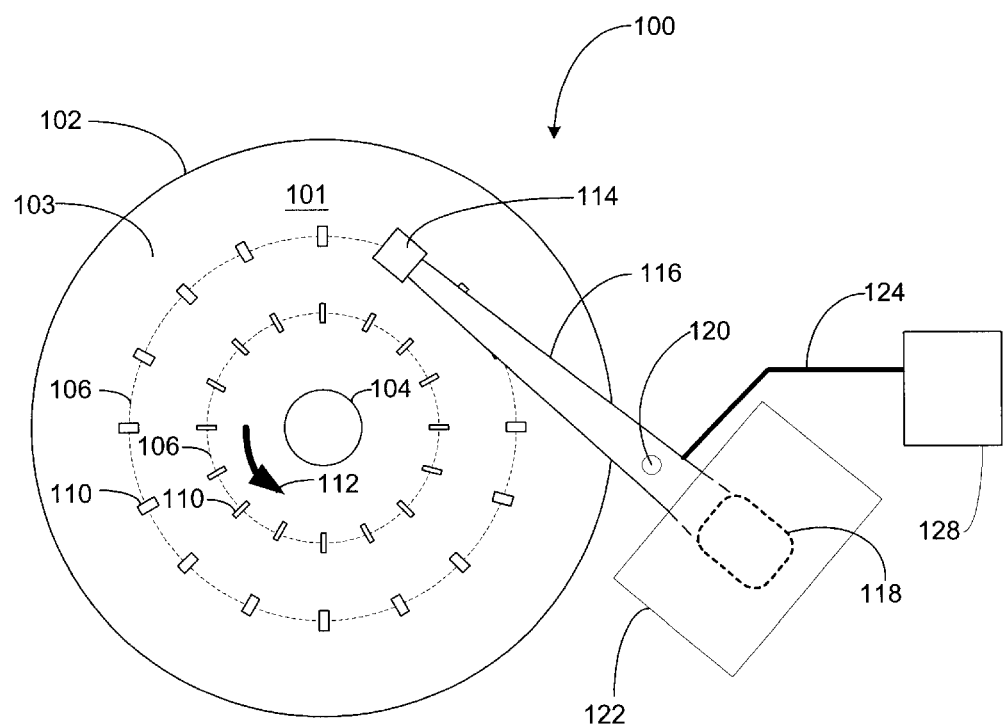
FIG. 1A illustrates a top view of an exemplary hard disk drive.

Reference will now be made to the drawings wherein like numerals refer to like parts throughout. FIG. 1A schematically illustrates an exemplary hard disk drive 100 for storing information. The hard disk drive 100 includes one or more disks 102 that have a magnetic media 101 formed on the surfaces 103 of the disks 102. The magnetic media 101 is programmable such that application of an external magnetic field results in a change of the magnetic state of the media which permits the magnetic media 101 to be selectively magnetized to store data. The disks 102 are preferably organized into a plurality of concentric magnetic domains which include servo tracks 106. A given servo track 106 is defined by a plurality of servo wedges 110 that are arranged so as to be equally spaced from an axis of a spindle 104 about which the disk 102 rotates. The servo wedges 110 on a given track 106 are spaced circumferentially in a periodic manner and they provide positional information used by a voice coil motor (VCM) servo system during reading and writing operations, and seeking and settling operations, in a manner known in the art.

The hard disk drive 100 further comprises a transducer 114 mounted on an actuator 116 that rotates about a pivot 120 due to controlled torques applied by a VCM 122. A signal bus 124 interconnects the transducer 114 and the VCM 122 to a controller 128 such that the controller 128 can control the movement of the actuator 116 in a manner well known in the art. Furthermore, the controller 128 sends and receives signals to and from the transducer 114 so as to permit the transducer to read, write, and erase information contained on the disk 102.

In operation, the disk 102 rotates in an exemplary direction 112 about the axis of the spindle 104 at a substantially fixed angular speed such that the surface 103 of the disk 102 moves relative to the transducer 114. The transducer's radial position on the disk 102 is changeable by the rotation of the actuator 116 so as to be able to position the transducer 114 on a desired servo track 106. The transducer's radial and circumferential position on the disk 102 is determined by reading of the information contained in the servo wedges 110 in a manner well known in the art. Once the transducer 114 is positioned on the desired servo track 106 within desirable limits, data can be written to or read from a circular arc between the servo wedges 110.

FIG. 1A further illustrates a coil 118 located at the end of the actuator 116, opposite from the transducer 114. As is well known in the art, when a current is passed through the coil 118, the coil forms an electromagnet that interacts with an existing magnetic field from a source such as a permanent magnet. The coil 118 and the permanent magnet are configured such that passing of the current in the coil 118 in one direction causes the actuator 116 to rotate in a first direction. When the current is passed through the coil 118 in the opposite direction, the actuator 116 rotates in a second direction that is substantially opposite from the first direction. The manner in which the current is applied to the coil 118 is described below in greater detail.

Figure 1B:
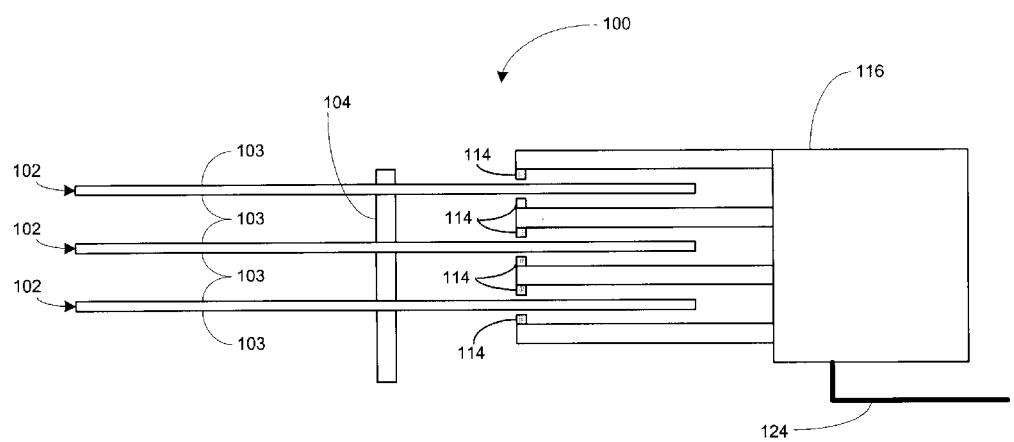
FIG. 1B illustrates a side view of the exemplary hard disk drive of FIG. 1A.

FIG. 1B illustrates a side view of the exemplary hard disk drive 100, showing that the hard disk drive 100 may have more than one disk 102 mounted on a common spindle 104. Associated with each disk surface 103 is a transducer 114 mounted to a common actuator 116. Thus, the disks 102 rotate in unison, and the transducers 114 move in unison relative to the rotating disks 102.

As is understood in the art, the transducer moves from one servo track to another servo track in what is referred to as a seek operation. The motion of the transducer is induced by the current flowing through the VCM, wherein the VCM generates a torque that is generally proportional to the magnitude of the current. Thus, a typical seek operation comprises application of a current that accelerates the transducer, followed by application of a reverse current that decelerates the transducer.

Figure 2:
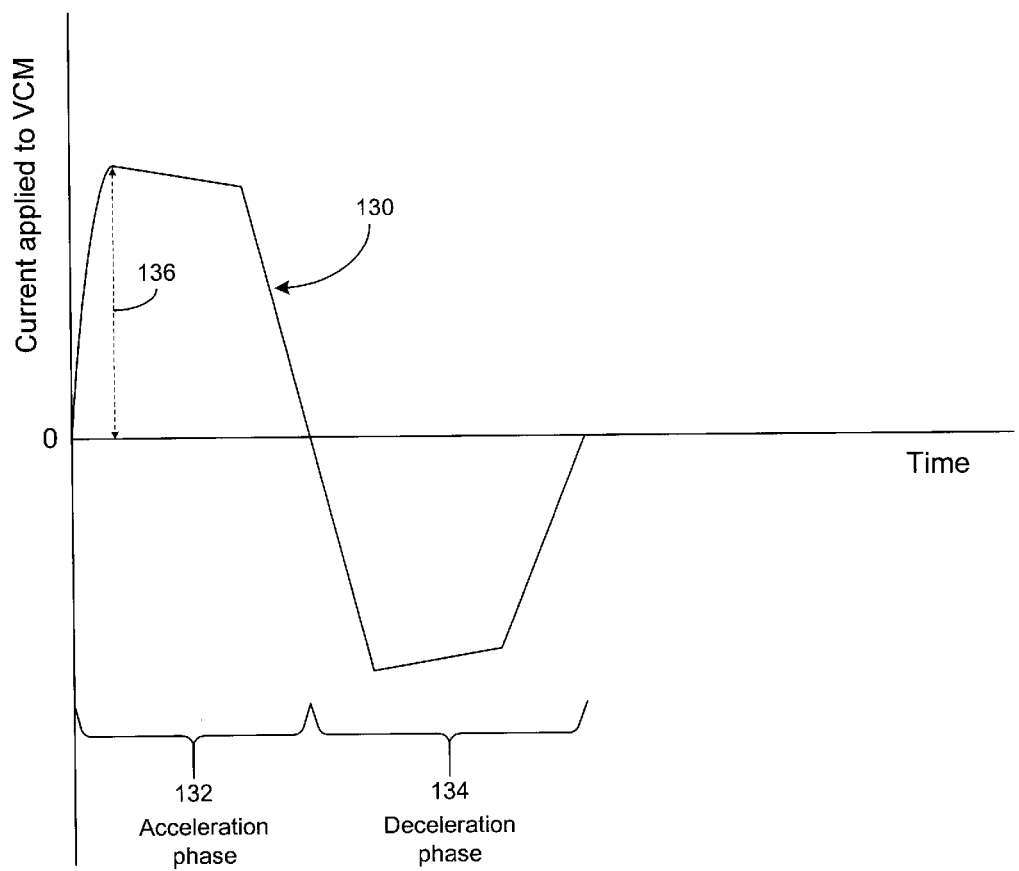
FIG. 2 illustrates an exemplary seek current profile comprising an acceleration phase followed by a deceleration phase.

FIG. 2 illustrates a current profile 130 representing the time dependence of the current applied to the VCM during a seek operation. One aspect of the invention relates to applying the VCM current during the acceleration phase such that the current magnitude reaches a peak value, wherein the peak value magnitude is determined and the current profile 130 is adjusted based in part on the peak value magnitude. In one embodiment of the invention, the peak acceleration current applied to the VCM corresponds to a saturation current, and the magnitude of the saturation current is determined in manners described below. The invention disclosed herein advantageously permits seek operations, or any type of movements of the transducer, to utilize more of the available current so as to improve the seek or movement performance of the transducer for a given VCM. The invention furthermore advantageously permits the disk drive to achieve a specified movement performance, such as a seek performance, using a reduced torque generating magnet by compensating such reduction with improved usage of the available current. Such reduction in magnet's torque generating capability equates to an advantageous reduction in the cost of the disk drive.

Figure 3:
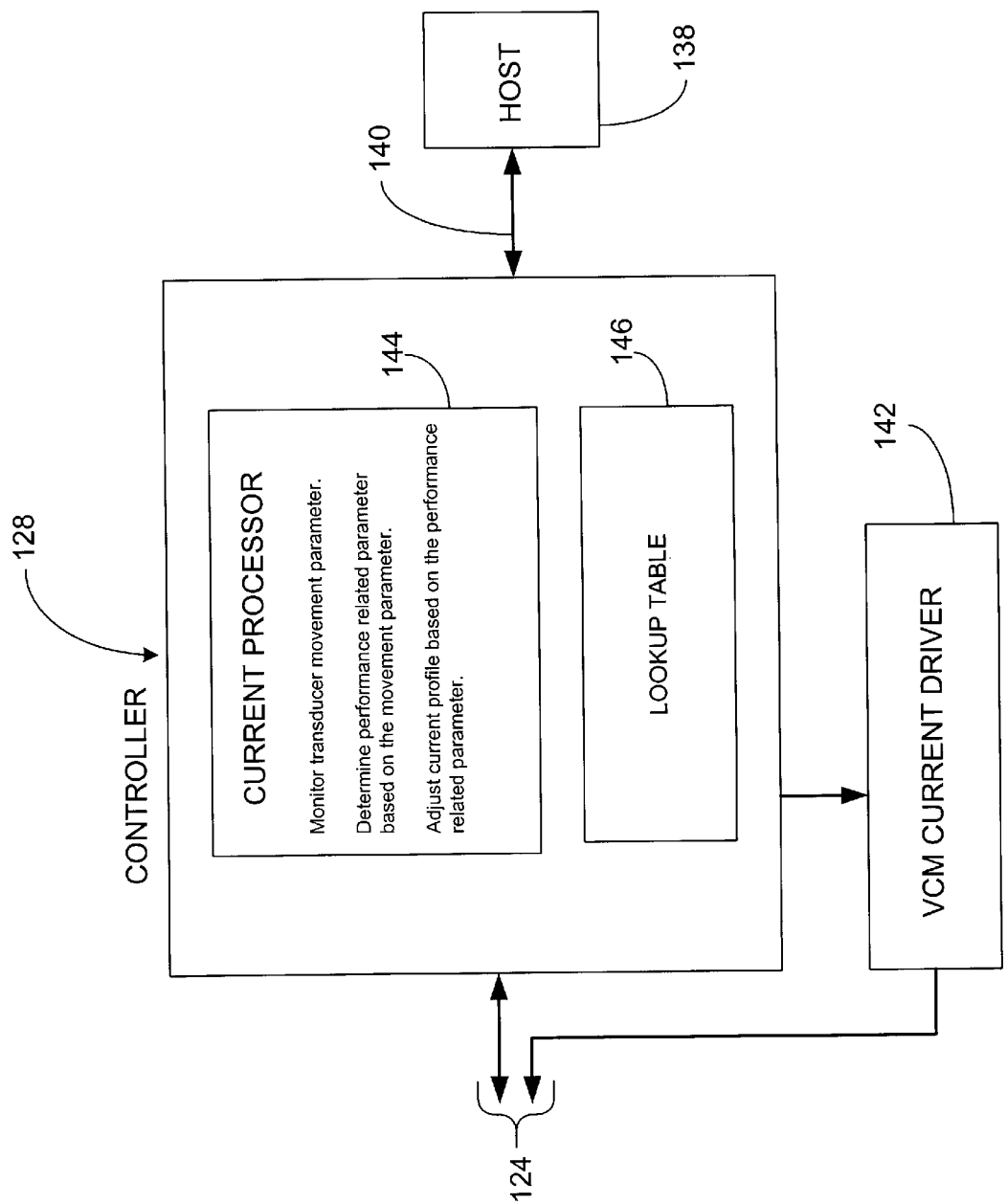
FIG. 3 illustrates one embodiment of a controller that comprises a current processor that determines current that is being supplied to a voice coil motor (VCM)

FIG. 3 illustrates the controller 128 interconnected to a host computer 138 by a bus 140 so as to permit transfer of data between the hard disk drive and the host 138 in a manner known in the art. The signal bus 124 permits the controller 128 to control the movement of the actuator, and thus the transducer, as well as transferring data between the disk and the controller 128 in a manner known in the art.

FIG. 3 further illustrates one aspect of the invention, wherein the controller 128 comprises a current processor 144 that monitors a parameter that is indicative of the movement of the transducer, determines a performance related parameter from the movement parameter, and advantageously adjusts the current profile based on the performance related parameter. As will be described below, the movement parameter may include transducer displacement, transducer acceleration, and current being supplied to the VCM. The performance related parameter described below comprises the available current to the VCM for a given operating condition.

In one embodiment, the current processor 144 determines the magnitude of the peak current being applied to the VCM in manners described below. The current processor 144 is further configured to adjust the seek current profiles that are applied to the VCM via a current driver 142, based in part on the magnitude of the peak acceleration current. In one embodiment of the invention, the seek current profiles are stored in a lookup table 146 that is part of the controller 128. In another embodiment, the seek current profile is calculated by the controller 128 based on seek parameters.

Figure 4:
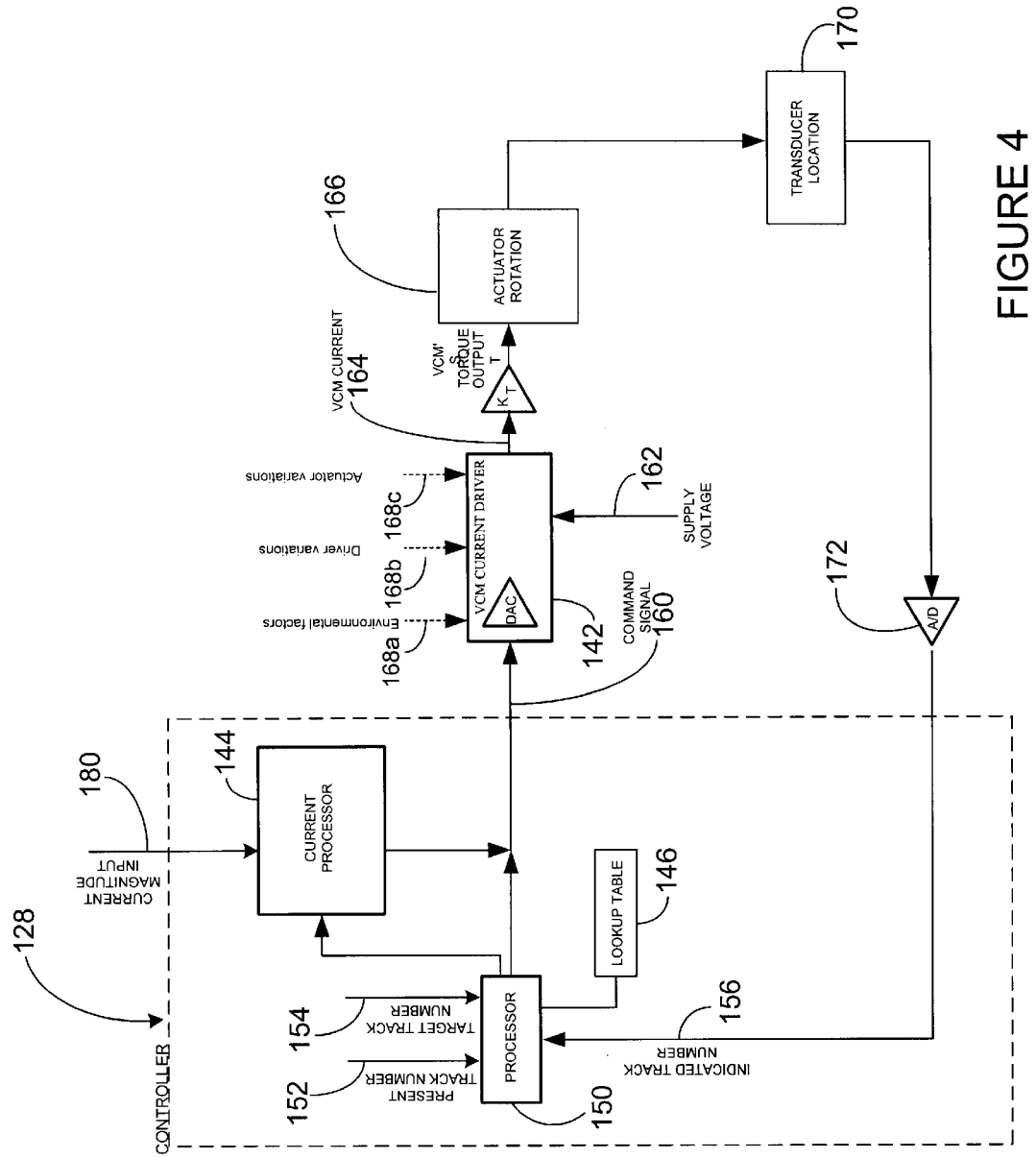
FIG. 4 illustrates an exemplary servo loop system that permits the controller to monitor location and velocity of a transducer during the seek operation so as to facilitate the current processor to determine the current being supplied to the VCM.

FIG. 4 illustrates a simplified exemplary servo loop diagram comprising the controller 128 that induces and monitors the movements of the transducer. As is understood in the art, a command signal 160 from the controller 128 is implemented by a digital to analog converter (DAC) of the VCM current driver 142 to yield a VCM current 164. The VCM current 164 generates a torque so as to cause an actuator rotation 166. The rotation of the actuator changes the position of the transducer relative to the disk, and the transducer's location 170 is monitored by the controller 128, wherein a signal corresponding to the transducer location 170 is typically converted to a digital signal indicative of an indicated track number 156 and off-track percentage value by an analog to digital converter (ADC) 172. The indicated track number 156 is input into a processor 150 that further continues the seek operation based on inputs of present track number 152 and target track number 154.

As is known in the art, the magnitude of the VCM current 164 output by the VCM current driver 142 depends on factors such as a supply voltage 162, environmental factors (such as temperature) 168a, driver variations (such as on-resistance) 168b, and actuator variations (such as coil resistance) 168c. Thus in certain operating conditions, the available VCM current 164 cannot meet the demanded current by the command signal 160. One such condition arises when the command signal 160 demands a current that exceeds a saturation level for a given operating condition affected by factors such as those described above. The amount of current which is delivered to the VCM under such condition is called saturation current.

In one embodiment of the invention, the processor 150 provides the indicated track number 156, beginning track number 152, and the target track number 154 to the current processor 144. The current processor 144 determines the current magnitude in manners described below.

Figure 5:
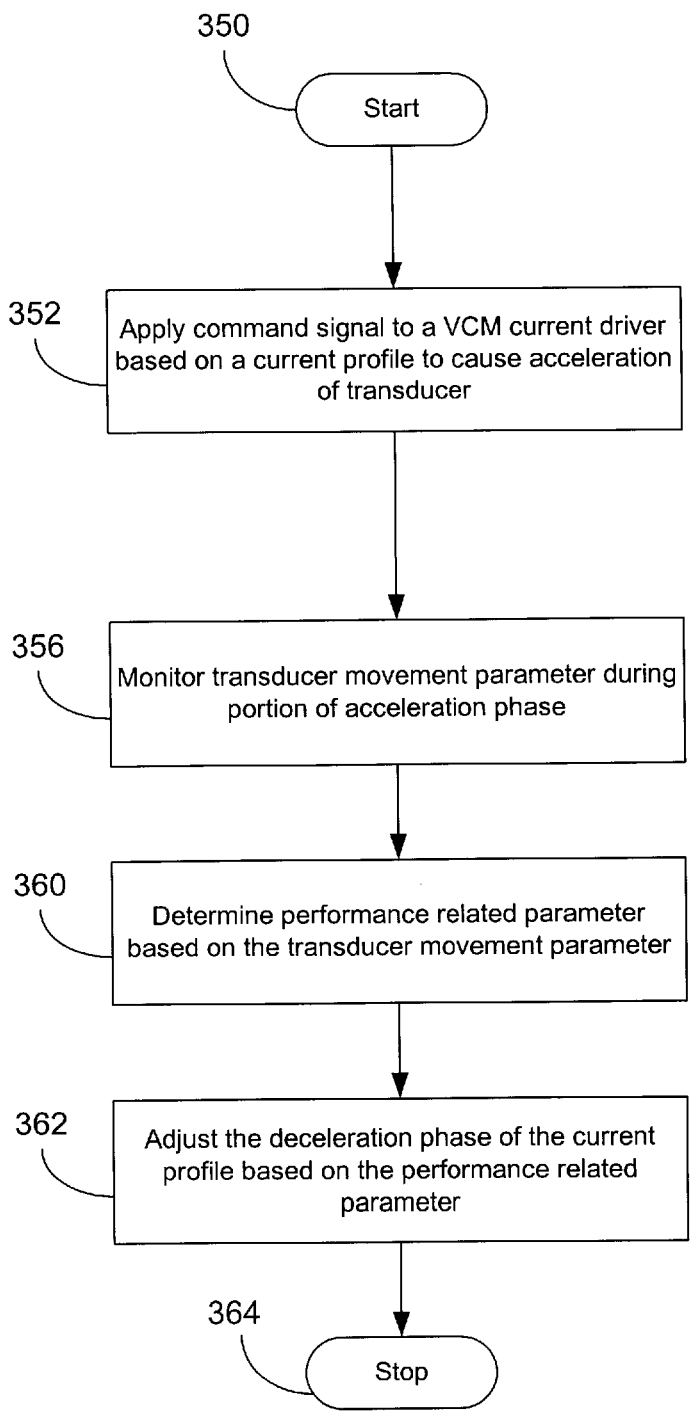
FIG. 5 illustrates one possible method of adjusting the seek current profile.

FIG. 5 illustrates one aspect of the invention that relates to a method of adjusting the deceleration phase of the current profile on the fly. The method begins at a start state 350, and in state 352 that follows, controller applies a command signal to the VCM current driver based on a current profile to cause acceleration of the transducer. In state 356, the controller monitors a parameter indicative of the movement of the transducer during portion of the acceleration phase. In state 360 that follows, the controller determines a performance related parameter based on the transducer movement parameter. In state 362, the controller adjusts the deceleration phase of the current profile based on the performance related parameter, and the process ends at a stop state 364.

Figures 6A, 6B:
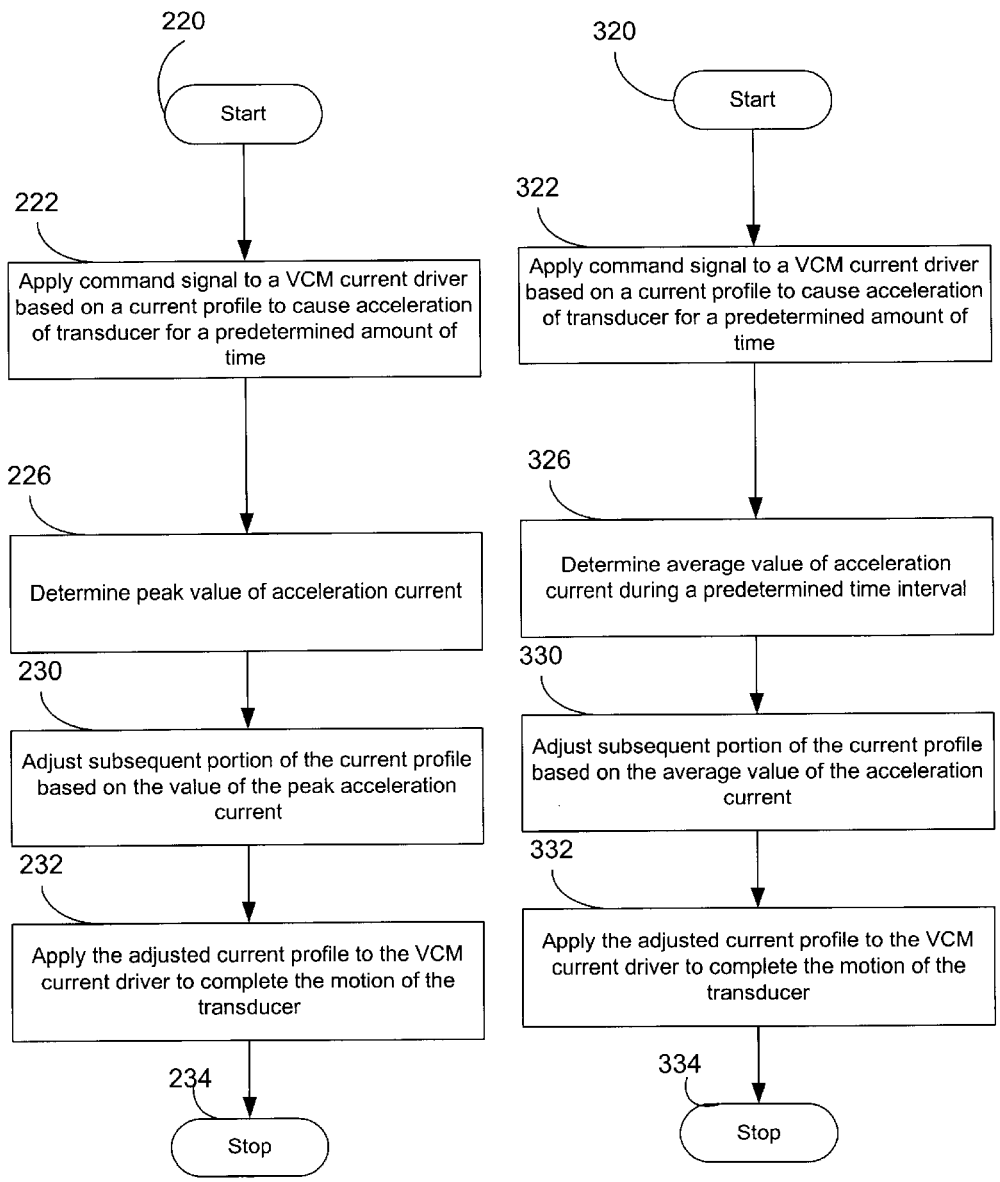
FIG. 6A illustrates one possible implementation of the invention, wherein the current profile is adjusted based in part on determination of peak acceleration current magnitude.
FIG. 6B illustrates an alternate implementation to the method of FIG. 6A, wherein average acceleration current is determined.

The performance related parameter comprises the available current in one embodiment of the invention. FIGS. 6–9 illustrate various methods of determining the available current from various transducer movement parameters. FIG. 6A illustrates one possible method that can be implemented in one embodiment of the invention, wherein the current magnitude is determined by the current processor and subsequently used to adjust a current profile. The process of determining the current magnitude in a given seek operation begins at a start state 220. In state 222, command signal is applied to the DAC based on a current profile to cause acceleration of the transducer. In state 226 that follows, peak acceleration current magnitude is determined. In state 230, the subsequent portion of the current profile is adjusted based on the peak acceleration current magnitude. In state 232, the adjusted current profile is applied to the VCM current driver to complete the motion of the transducer, and the process ends at a stop state 243.

FIG. 6B illustrates another possible method that can be implemented as an alternate to the method described above in reference to FIG. 6A. The method determines an average value instead of the peak value of the acceleration current. The process of determining the current magnitude in a given seek operation begins at a start state 320. In state 322, command signal is applied to the DAC based on a current profile to cause acceleration of the transducer. In state 326 that follows, average acceleration current magnitude during a predetermined time interval is determined. In state 330, the subsequent portion of the current profile is adjusted based on the average acceleration current magnitude. In state 332, the adjusted current profile is applied to the VCM current driver to complete the motion of the transducer, and the process ends at a stop state 334.

Figure 7:
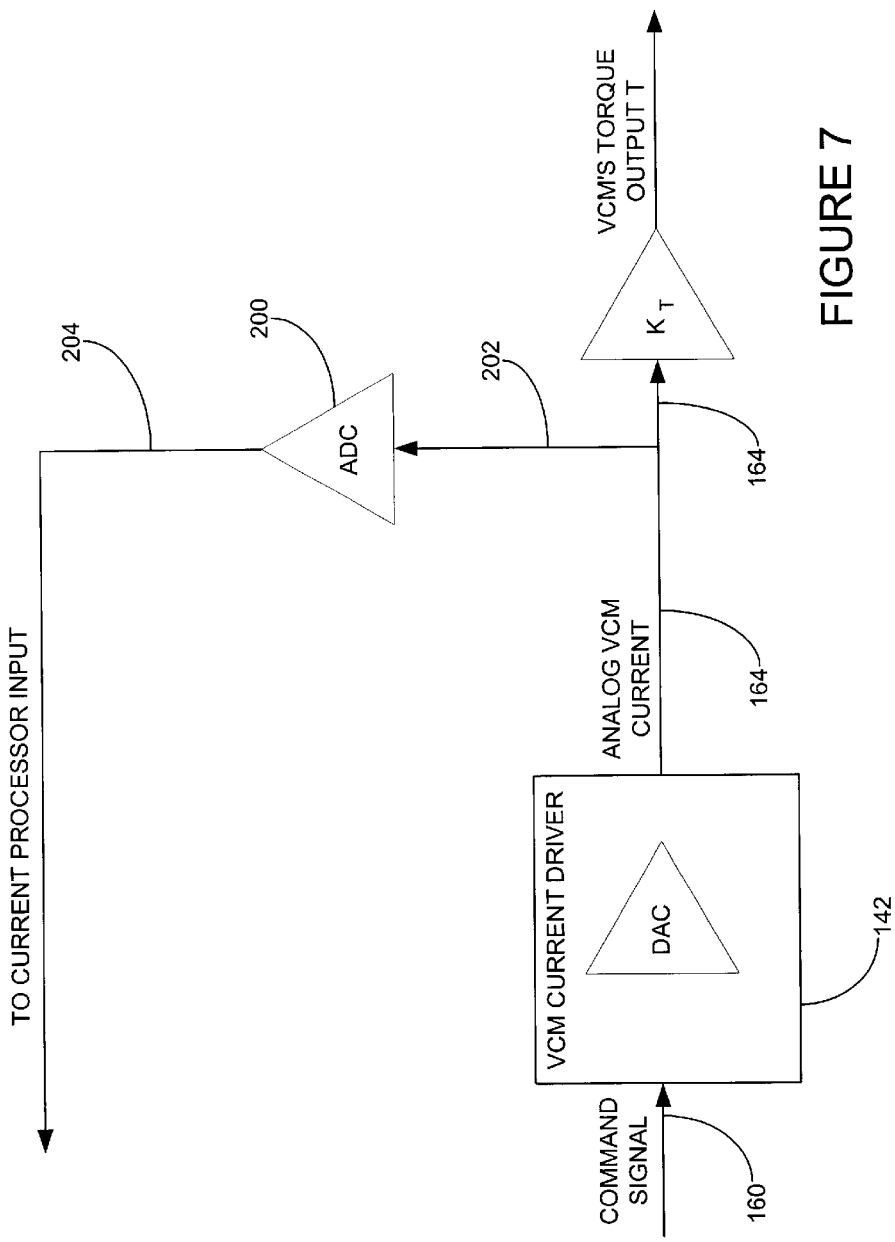
FIG. 7 illustrates one possible method of determining the peak acceleration current magnitude using an analog to digital converter (ADC)

FIG. 7 illustrates one possible method of determining the magnitude of the current 164 that results from a command signal 160 being implemented by the VCM current driver 142. The current 164 is sampled by an ADC 200, and a digital signal 204 indicative of the current magnitude is passed onto the current processor (not shown) to be used in adjusting the current profile.

In one embodiment, the ADC 200 samples the VCM current 164 throughout the acceleration phase of the seek operation, and the magnitudes of the current are passed onto the current processor. The current processor then determines the maximum magnitude value during a predetermined time window, and designates that magnitude as being indicative of the available current that can be utilized. In one embodiment, the predetermined time window comprises a duration equivalent to approximately 10 wedge-to-wedge time intervals, starting from beginning of the transducer's motion. As is understood in the art, the wedge-to-wedge time interval is a common unit of time that is substantially constant, since the servo wedges are spaced circumferentially in a substantially periodic manner, and the disk spins at a substantially fixed rate. For a disk that has 128 servo wedges per servo track, and spins at approximately 7200 rpm, one wedge-to-wedge time interval represents approximately 65 $\mu$s.

Another aspect of the invention relates to applying a saturation current to the VCM, wherein the saturation current represents the maximum available current for a given operating condition as referred to above. The magnitude of the saturation current may be determined by the ADC as described above in reference to FIG. 7, or by alternate methods described below, wherein the magnitude of the current is determined without using a direct sampling device such as the ADC.

Figure 8:
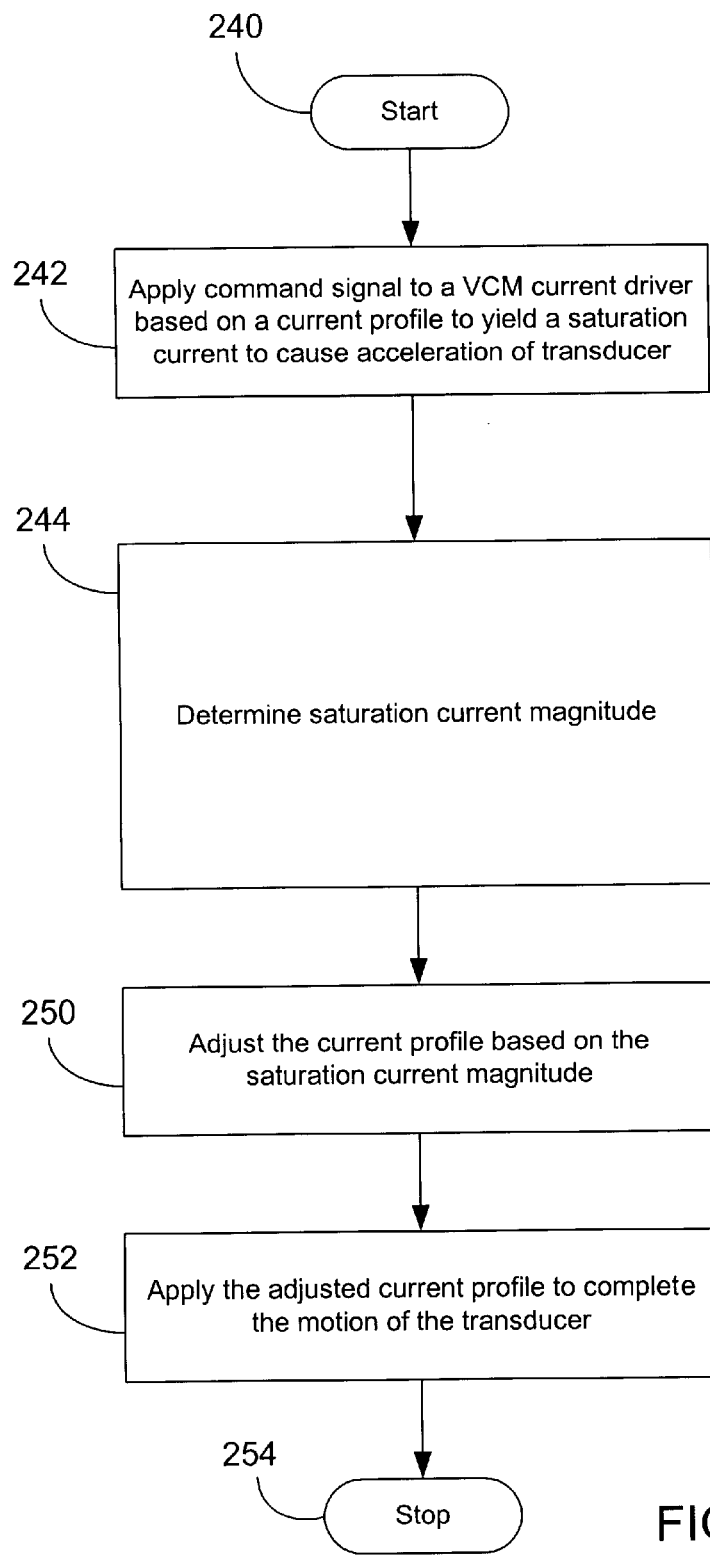
FIG. 8 illustrates another possible method that determines saturation acceleration current magnitude and adjusts the current profile accordingly.

FIG. 8 illustrates one possible method that can be used in another embodiment of the invention, wherein the saturation current magnitude is determined by the current processor without relying on the ADC as described above. The process of determining the saturation current magnitude in a given seek operation begins at a start state 240. In state 242, a command signal is applied to the VCM current driver based on a current profile to yield the saturation current that causes acceleration of the transducer. In state 246 that follows, the saturation current magnitude is determined. In state 250, current profile is adjusted based on the saturation current magnitude, and in state 252 that follows, the adjusted current profile is applied to the VCM current driver to complete the motion of the transducer. The process ends at a stop state 254.

Figure 9A:
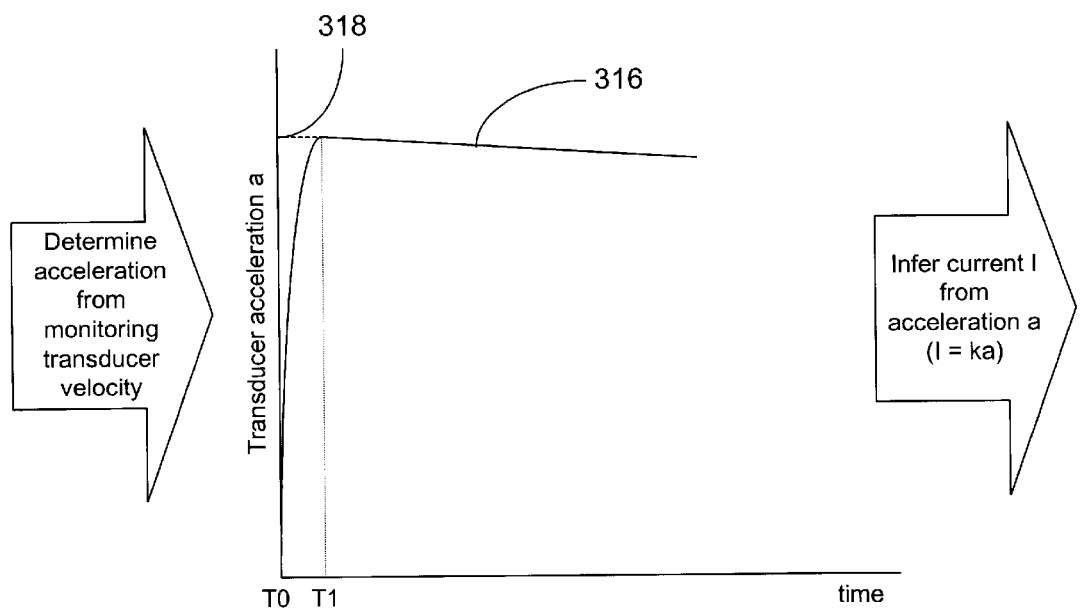
FIG. 9A illustrates one possible method of determining the saturation acceleration current by inferring the current from acceleration that is determined from monitoring of the transducer velocity.
Figures 9B, 9C:
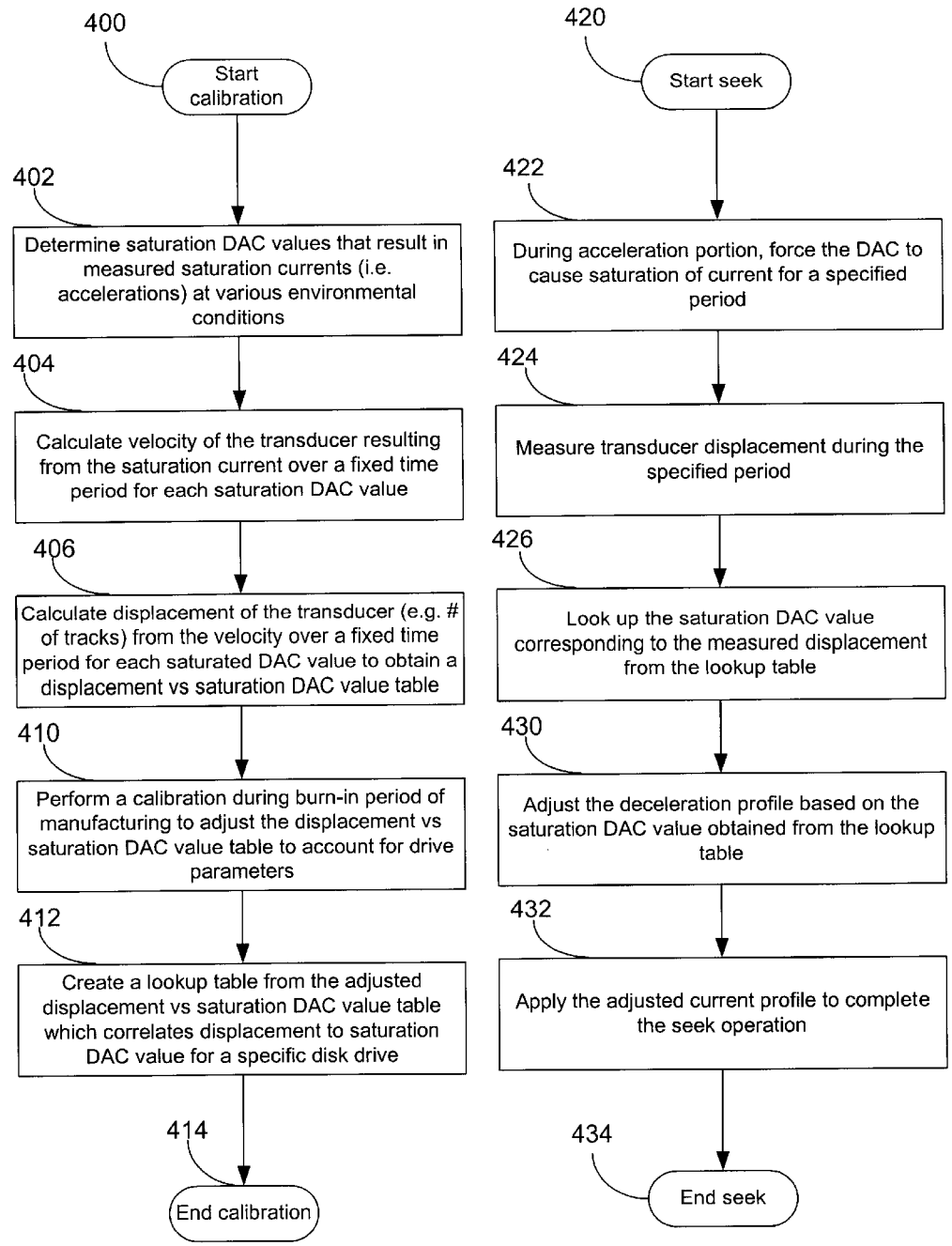
FIG. 9B illustrates a calibration process that forms a lookup table correlating a saturation digital to analog converter (DAC) value to transducer displacement caused by the saturation DAC value during a fixed time period.
FIG. 9C illustrates the use of the saturation DAC value vs displacement lookup table to perform a seek operation.

FIGS. 9A–C illustrate two possible methods of determining the saturation current magnitude during the acceleration of the transducer. Such methods can be utilized in state 242 of the method described above in reference to FIG. 8.

FIG. 9A illustrates one possible method of determining the saturation current in the method described above in reference to FIG. 8. The method comprises determining an acceleration curve 316 by monitoring the rate of change of the transducer's velocity. As is understood in the art, the velocity of the transducer may be determined from monitoring the positions of the transducer, or measured directly, for example, by monitoring VCM back-emf voltage. As is further understood in the art, the position of the transducer is monitored by the controller by monitoring the servo wedges and track IDs encountered by the transducer. Since the VCM current is proportional to the acceleration of the transducer in a known manner, the current magnitude is determined. Thus, the maximum current magnitude (saturation current magnitude in this case) corresponds to the maximum acceleration 318 achieved by the transducer at time T1.

FIGS. 9B–C illustrate another method of determining the saturation current in the method described above in reference to FIG. 8. In particular, FIG. 9B illustrates a calibration method for obtaining a lookup table that correlates displacement of the accelerating transducer during a specified time interval to a saturation DAC value that caused the displacement. FIG. 9C illustrates a process of performing a seek operation wherein such a lookup table is utilized to determine the saturation DAC value from the measured displacement, so as to advantageously determine the available DAC range, i.e. available current range.

The calibration process illustrated in FIG. 9B begins at a start state 400. In state 402, saturation DAC values that result in measured saturation currents (i.e., accelerations) at various environmental conditions are determined. In state 404 that follows, velocity of the transducer resulting from the saturation current over a fixed time period is determined for each saturation DAC value obtained in state 402. In state 406, displacement of the transducer, expressed for example in number of tracks, from the velocity over a fixed time period is determined for each DAC value to obtain a displacement vs saturation DAC value table. In state 410 that follows, a calibration is performed during a burn-in period of manufacturing to adjust the displacement vs saturation DAC value table to account for drive parameters. In state 412, a lookup table is created from the adjusted displacement vs saturation DAC value table, wherein the lookup table correlates displacement to saturation DAC value for a specific disk drive. The calibration process ends at state 414.

It will be appreciated that the calibration process being performed during manufacturing is exemplary. Thus it will be appreciated that the calibration described above in reference to FIG. 9B may be performed during any number of stages without departing from the spirit of the invention.

The seek operation illustrated in FIG. 9C begins at a start state 420. In state 422, the transducer is accelerated by a saturation current for a specified period, wherein the saturation current is caused by a selected DAC value. In state 424 that follows, transducer displacement during the specified period is measured. In state 426, the lookup table obtained from the calibration process of FIG. 9B is invoked to determine the saturation DAC value corresponding to the measured displacement. In state 430 that follows, the deceleration profile is adjusted based on the saturation DAC value obtained from the lookup table in state 426. In state 432, the adjusted current profile is applied to the VCM to complete the seek operation. The seek operation ends at state 434.

It will be appreciated that various aspects of the method of obtaining the lookup table described above in reference to FIG. 9B are known in the art. For example, method of obtaining a displacement vs demanded saturation DAC value correlation is disclosed in the U.S. Pat. No. 5,793,558 to Codilian et al which is hereby incorporated by reference.

It will be appreciated that the various aspects of the invention described herein advantageously permit seek operation to be adjusted on the fly. The methods and various embodiments of the invention are particularly suitable for seeks that involve establishment of stable acceleration phases, due to the time needed to process various parameters and adjust the current profile accordingly. In one embodiment, such suitable seeks correspond to seek lengths that are greater than approximately 200 servo tracks. In another embodiment, such a cutoff seek length may be set at 500 or 1000 servo tracks.

Figure 10A:
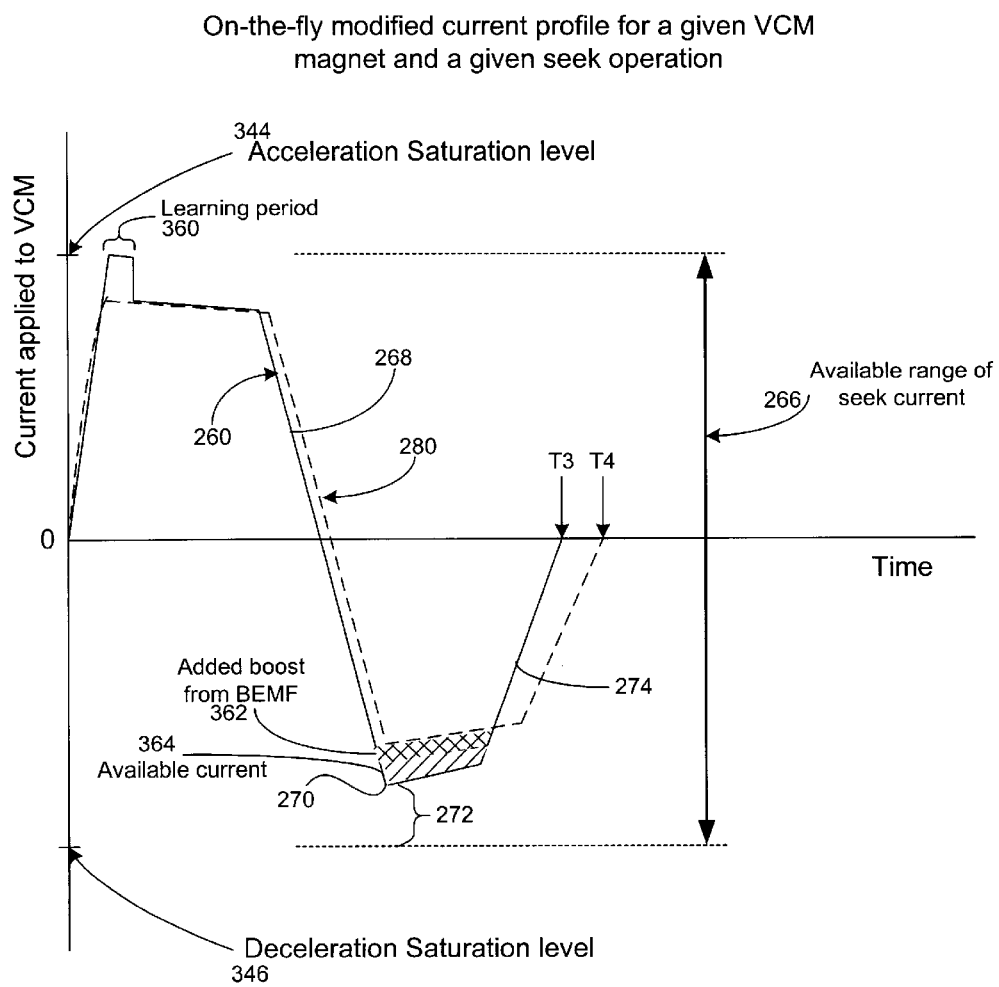
FIG. 10A illustrate one possible advantage afforded by utilizing more of the available current, wherein the available current is determined during a learning period at the beginning portion of the acceleration phase, wherein accordingly adjusted profile leads to a faster completion of a given seek operation using a given VCM magnet.

FIGS. 10A, B, and 11 illustrate two possible advantages afforded by the various embodiments described above. FIG. 10A illustrates an exemplary seek current profile 260 generated by one embodiment of the invention compared to a traditional seek current profile 280 that uses a conservative predetermined maximum current that is considerably less than the actual saturation level. The seek current profile 260 utilizes more of the available range of seek current 266 than that of the traditional seek current profile 280 so as to provide a faster seek operation. As shown in FIG. 10A, the available range of current 266 comprises a range of current magnitudes between acceleration saturation current level 344 and deceleration saturation current level 346. As is understood in the art, the deceleration saturation current level 346 is generally greater in magnitude than the acceleration saturation current level 344 due to the back-emf effect.

The improved seek current profile 260 includes a saturation current magnitude which is determined in manners described above. The saturation current magnitude thus determined is used to adjust the seek current profile 260 such that subsequent portion of the profile utilizes more of the available range of seek current 266. In one embodiment illustrated in FIG. 10A, the saturation current magnitude is determined during a learning period 360, and the remaining portion of the acceleration phase utilizes a non-saturating current. The current profile 260 further comprises a transition phase 268 during which the current reverses direction so as to permit the transducer to decelerate. The decelerating current reaches a maximum level 270. The deceleration phase of the seek operation is completed by a final deceleration phase 274, during which the transducer approaches its intended target servo track.

As is understood in the art, the deceleration phase plays a significant role in determining whether a seek operation will be successful in first attempt, and is generally considered to be more important in this regard than the acceleration phase. As is also understood in the art, the maximum deceleration magnitude 270 is generally selected to be less than the maximum acceleration magnitude so as to provide a margin 272 of reserve power that can be used if necessary. Thus, in the current profile 260, the margin 272 is the difference between the saturation level and the maximum deceleration magnitude 270.

It will be appreciated that the maximum deceleration magnitude 270 is obtained by combination of added boost from back-emf 362 (known in the art) and the more efficient use of available current 364. The traditional current profile 280, while comprising similar phases of the seek operation as described above, and also benefiting from the back-emf boost (not shown), does not reach maximum acceleration and deceleration levels of the current profile 260. As referred to above, one reason is due to the traditional current profile 280 using predetermined conservative maximum levels that can accommodate a wide range of operating conditions without modifying the current profile. As is understood in the art, using a larger current permits the desired acceleration and deceleration to be achieved faster, so as to complete the seek operation sooner. Thus in the exemplary comparison for a given seek operation and a given VCM magnet illustrated in FIG. 10A, the seek current profile 260 advantageously completes the seek operation at time T3, while the traditional seek current profile 280 completes the same seek operation at time T4 that is larger than T3.

Figure 10B:
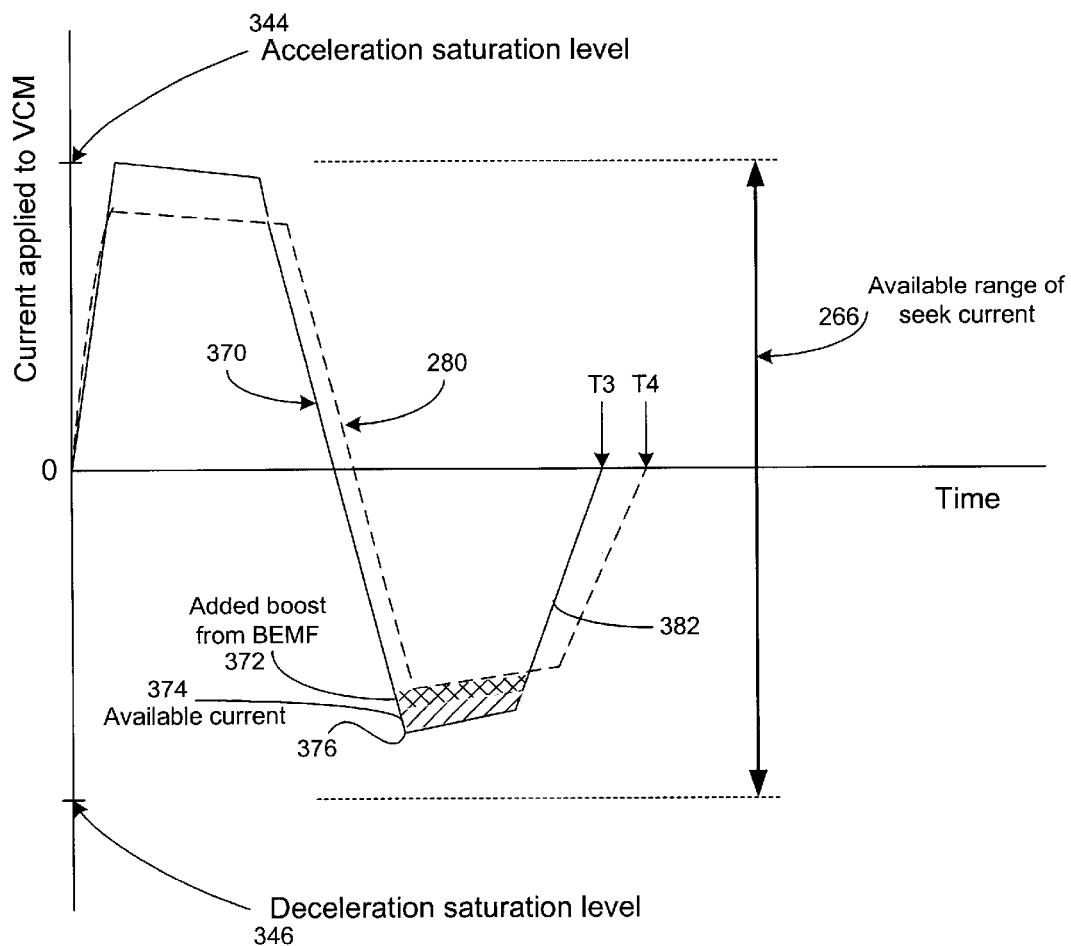
FIG. 10B illustrates an alternate method of determining the available current, wherein the available current is determined during acceleration performed at saturation level, wherein accordingly adjusted profile also leads to a faster completion of a given seek.

FIG. 10B illustrates another comparison of the traditional current profile 280 to another current profile 370 that implements the inventive features described herein. The current profile 370 comprises a saturation phase that is operated at saturation level, and the available range of current 266 is determined in any of the inventive methods described above. The current profile 370 reaches a maximum deceleration magnitude 376 aided by back-emf boost 372 and efficient use of available current 374 in a manner similar to that described above in reference to FIG. 10A. Thus, deceleration phase 382 of the seek operation is able to advantageously complete the seek operation at time T3 that is less than T4, the time required to complete the same seek operation using the traditional current profile.

Figure 11:
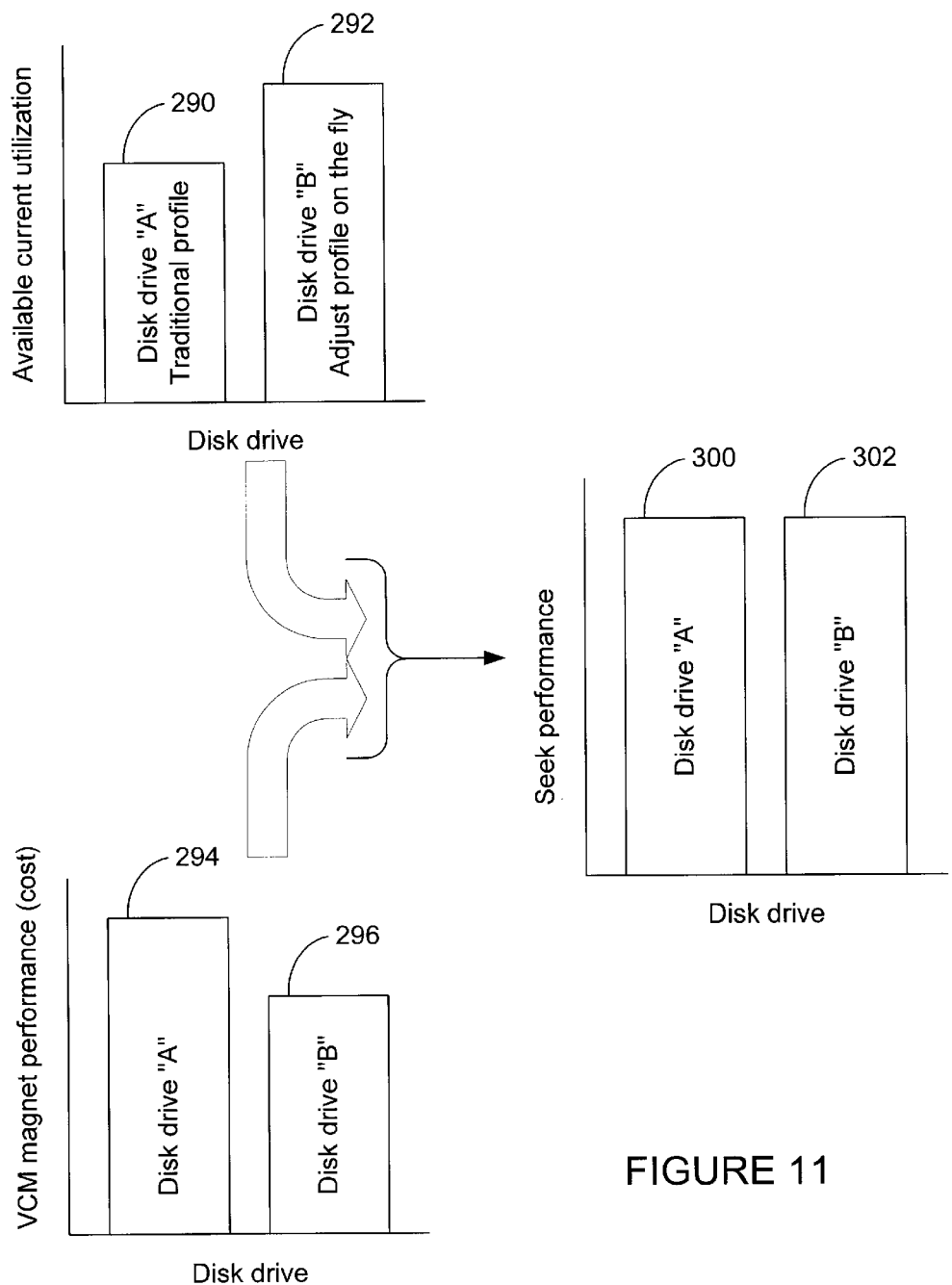
FIG. 11 illustrates another possible advantage afforded by utilizing more of the available current, wherein more efficient use of the available current permits a VCM to use lower torque generating magnet to maintain a specified seek performance, wherein use of lower torque generating magnet reduces the cost of the disk drive advantageously.

FIG. 11 illustrates another advantage of utilizing a wider range of available current. A traditional disk drive A and a drive B that uses the inventive feature are compared for their available current utilization and VCM magnet performance parameters. As described above in reference to FIGS. 10A–B, drive B utilizes more of the available current than drive B. This is indicated by bars 290 (for A) and 292 (for B) in the comparison bar graph.

The VCM magnet performance between drives A and B are also compared in the comparison bar graph, wherein the exemplary drive A has a higher torque generating magnet than the exemplary drive B. As is understood in the art, the higher torque generating magnet generally yields greater acceleration and deceleration of the transducer. Thus, seek performance comparison between drives A and B, wherein the seek performance includes a combination of available current utilization and magnet's torque generating capability, shows that drives A and B may achieve similar performance at nominal operating conditions. As is further understood in the art, higher torque generating magnet generally costs more. Thus, drive B, by utilizing a lower cost magnet and compensating for reduction in magnet's torque generating capability by more efficient utilization of the available current, advantageously maintains a specified seek performance at nominal operating conditions while lowering the cost of the drive. In one embodiment, use of lower cost magnet reduces the cost of the drive by approximately $0.50 to $1.00. It will be appreciated that such reduction in cost per unit is significant when large number of disk drives are considered.

It will be appreciated that the inventive features described above may be implemented in hard disk drives in a manner that is relatively easy. In particular, the method of determining the saturation current magnitude without using the ADC, and adjusting the current profile thereafter, can be implemented at a firmware level in the disk drive controller. Thus in one embodiment, the current processor described above is a functional block of software that performs its task in manners described above.

What is claimed is:

1. A hard disk drive comprising:
   a rotatable disk having a magnetic recording media wherein the rotatable disk defines a plurality of concentric servo tracks;

a pivotable actuator that is movable with respect to the rotatable disk;

a transducer disposed on the actuator so as to be movable with respect to the disk so as to be positionable on a selected servo track of the plurality of concentric servo tracks;

a voice coil motor that moves the pivotable actuator in response to an applied current so as to permit movement of the transducer from a first location to a second location wherein movement comprises an acceleration phase and a deceleration phase; and a controller for controlling the applied current according to a current profile, wherein the current profile has a first portion corresponding to the acceleration phase, and a second portion corresponding to the deceleration phase, and wherein the controller monitors a parameter indicative of the movement of the actuator during the application of the first portion of the current profile to determine a performance related parameter and wherein the controller then utilizes the performance related parameter to adjust the configuration of the second portion of the current profile to thereby reduce the time needed to position the transducer adjacent the second servo track.

2. The hard disk drive of claim 1, wherein the performance related parameter is peak acceleration current magnitude.

3. The hard disk drive of claim 2, wherein the peak acceleration current is a saturation current whose magnitude depends on operating condition of the disk drive.

4. The hard disk drive of claim 3, wherein the saturation current at a given operating condition defines a full range of current available for application to the voice coil motor.

5. The hard disk drive of claim 4, wherein determination of the saturation current magnitude permits adjustment of the current profile to utilize more of the full range of the available current.

6. The hard disk drive of claim 1, wherein the performance related parameter is an average acceleration current magnitude.

7. The hard disk drive of claim 6, wherein the average accelerating current magnitude corresponds to an average saturated accelerating current.

8. The hard disk drive of claim 1, wherein the parameter indicative of the movement of the actuator is the current being applied to the voice coil motor.

9. The hard disk drive of claim 8, wherein the current is measured directly by an analog to digital converter.

10. The hard disk drive of claim 1, wherein the parameter indicative of the movement of the actuator is displacement of the transducer.

11. The hard disk drive of claim 10, wherein the displacement of the transducer is determined by monitoring the servo wedges and track IDs encountered by the transducer.

12. The hard disk drive of claim 11, wherein rate of change of displacement of the transducer permits monitoring of velocity of the transducer.

13. The hard disk drive of claim 12, wherein rate of change of velocity of the transducer permits monitoring of acceleration of the transducer.

14. The hard disk drive of claim 13, wherein the rate of change of velocity is determined by monitoring back-emf induced in the voice coil motor.

15. The hard disk drive of claim 14, wherein the current being applied to the voice coil motor is inferred from the acceleration of the transducer.

16. The hard disk drive of claim 15, wherein the acceleration of the transducer is linearly proportional to the current being applied to the voice coil motor.

17. The hard disk drive of claim 1, wherein the parameter indicative of the movement of the actuator is displacement of the transducer during a predetermined time interval.

18. The hard disk drive of claim 17, wherein the displacement of the transducer is correlated to a saturation point of a demanded digital to analog converter (DAC) value.

19. The hard disk drive of claim 18, wherein the correlation between the displacement and the saturation DAC value is obtained from a lookup table.

20. The hard disk drive of claim 19, wherein the lookup table is determined during calibration of the disk drive.

21. The hard disk drive of claim 1, wherein the movement of the transducer comprises a seek operation wherein the first location corresponds to a first servo track and the second location corresponds to a second servo track.

22. The hard disk drive of claim 21, wherein the seek operation involves a seek time sufficiently long enough to establish a stable acceleration of the transducer.

23. The hard disk drive of claim 22, wherein the sufficiently long enough seek time corresponds to seek lengths greater than approximately 200 servo tracks.

24. The hard disk drive of claim 21, wherein the performance related parameter is determined during each seek operation.

25. The hard disk drive of claim 21, wherein the performance related parameter is determined periodically.

26. The hard disk drive of claim 25, wherein the performance related parameter is determined after every 100 seek operations.

27. A method of adjusting a current profile on the fly during a movement of a transducer, wherein the current profile determines the manner in which current is applied to a voice coil motor so as to move the transducer mounted on an actuator from a first location to a second location, wherein the movement of the transducer comprises an acceleration phase followed by a deceleration phase, the method comprising:

applying an acceleration current according to the current profile so as to cause the acceleration of the transducer;

determining the peak value of the acceleration current; and adjusting the subsequent portion of the current profile based at least in part on the peak value of the acceleration current.

28. The method of claim 27, wherein applying the acceleration current comprises applying a saturation current.

29. The method of claim 28, wherein determining the peak value of the acceleration current comprises determining the magnitude of the saturation current.

30. The method of claim 29, wherein the magnitude of the saturation current is determined by an analog to digital converter.

31. The method of claim 29, wherein the magnitude of the saturation current is determined inferentially by monitoring the acceleration of the transducer.

32. The method of claim 31, wherein the acceleration of the transducer is determined from monitoring of displacement of the transducer.

33. The method of claim 29, wherein the magnitude of the saturation current is determined by correlating the displacement of the transducer to the magnitude of the saturation current that caused the displacement, wherein the correlation between the displacement and the magnitude of the saturation current is obtained from a lookup table.

34. The method of claim 27, wherein adjusting the subsequent portion of the current profile comprises adjusting the profile of the deceleration current.

35. The method of claim 34, wherein adjusting the profile of the deceleration current comprises increasing the magnitude of the deceleration current so as to utilize more of available current range as determined by the saturation current magnitude.

36. The method of claim 34, wherein adjusting the profile of the deceleration current comprises decreasing the magnitude of the deceleration current.

37. A method of adjusting a current profile that causes movement of a transducer, wherein the current profile has a first portion corresponding to an acceleration phase and a second portion corresponding to a deceleration phase, the method comprising:

monitoring a parameter indicative of the movement of the transducer during the application of the first portion of the current profile;

determining a performance related parameter based at least in part on the parameter indicative of the movement of the transducer; and adjusting the configuration of the second portion of the current profile based at least in part on the performance related parameter.

38. The method of claim 37, wherein monitoring the parameter indicative of the movement of the transducer comprises monitoring a current that causes the movement of the transducer.

39. The method of claim 38, wherein monitoring the current comprises measuring the current's magnitude using an analog to digital converter.

40. The method of claim 37, wherein monitoring the parameter indicative of the movement of the transducer comprises monitoring the position of the transducer.

41. The method of claim 40, wherein monitoring the parameter indicative of the movement of the transducer further comprises determining the velocity of the transducer based on the rate of change of the position of the transducer.

42. The method of claim 41, wherein the velocity of the transducer is determined by monitoring back-emf induced in the voice coil motor.

43. The method of claim 42, wherein monitoring the parameter indicative of the movement of the transducer further comprises determining the acceleration of the transducer based on the rate of change of the velocity of the transducer.

44. The method of claim 43, wherein monitoring the parameter indicative of the movement of the transducer further comprises determining the current that causes the movement of the transducer based on the acceleration of the transducer, wherein the current is inferred from the acceleration.

45. The method of claim 44, wherein the current is generally linearly proportional to the acceleration.

46. The method of claim 45, wherein determining the performance related parameter comprises determining the magnitude of the current at its peak value.

47. The method of claim 46, wherein determining the magnitude of the current at its peak value comprises determining the magnitude of a saturation current.

48. The method of claim 38, wherein monitoring the current comprises monitoring the displacement of the transducer during a predetermined time interval and correlating the displacement to the saturation current magnitude that caused the displacement.

49. The method of claim 48, wherein the correlation between the displacement and the saturation current magnitude is obtained from a lookup table.

50. The method of claim 37, wherein adjusting the configuration of the second portion of the current profile comprises adjusting the magnitude of peak value of the current of the second portion of the current profile based on the magnitude of peak value of the current of the first portion of the current profile.

51. The method of claim 50, wherein adjusting the configuration of the second portion of the current profile comprises increasing the magnitude of the peak value of the current of the second portion of the current profile.

52. The method of claim 51, wherein increasing the magnitude of the current of the second portion of the current profile comprises increasing the magnitude of the current of the deceleration phase.

53. The method of claim 50, wherein adjusting the configuration of the second portion of the current profile comprises decreasing the magnitude of the peak value of the current of the second portion of the current profile.

54. The method of claim 53, wherein decreasing the magnitude of the current of the second portion of the current profile comprises decreasing the magnitude of the current of the deceleration phase.

55. The method of claim 37, wherein the movement of the transducer is a seek operation.

* * * * *